US 6,624,804 B2

(12) United States Patent
Sterling

(10) Patent No.: US 6,624,804 B2
(45) Date of Patent: Sep. 23, 2003

(54) POSITIONING A CURSOR ON THE DISPLAY SCREEN OF A COMPUTER

(75) Inventor: Hans Rudolf Sterling, Cape Town (ZA)

(73) Assignee: Ethertouch Limited of Brumby House (MY)

( * ) Notice: Subject to any disclaimer, the term of this patent is extended or adjusted under 35 U.S.C. 154(b) by 0 days.

(21) Appl. No.: 10/298,025

(22) Filed: Nov. 15, 2002

(65) Prior Publication Data

US 2003/0071786 A1 Apr. 17, 2003

Related U.S. Application Data

(63) Continuation of application No. 09/684,149, filed on Oct. 6, 2000, which is a continuation of application No. PCT/IB99/00579, filed on Apr. 6, 1999.

(30) Foreign Application Priority Data

Apr. 6, 1998 (ZA) ............................................... 98/2910

(51) Int. Cl.[7] .................................................. G09G 5/08
(52) U.S. Cl. ........................ 345/157; 345/158; 345/173
(58) Field of Search ................................. 345/173, 174, 345/175, 179, 156, 157, 168, 158; 341/21, 22, 31, 32, 33; 178/18.01, 18.11, 19.01–19.07

(56) References Cited

U.S. PATENT DOCUMENTS

| | | | |
|---|---|---|---|
| 4,754,268 A | 6/1988 | Mori | 340/710 |
| 4,845,503 A | 7/1989 | Adam et al. | 342/448 |
| 4,988,981 A | 1/1991 | Zimmerman et al. | 340/709 |
| 5,164,713 A | 11/1992 | Bain | 340/710 |
| 5,444,462 A | 8/1995 | Wambach | 345/158 |
| 5,453,759 A | 9/1995 | Seebach | 345/158 |
| 5,481,265 A | 1/1996 | Russell | 341/22 |
| 5,489,922 A | 2/1996 | Zloof | 345/156 |
| 5,914,701 A | 6/1999 | Gersheneld et al. | 345/156 |

FOREIGN PATENT DOCUMENTS

| | | |
|---|---|---|
| DE | 3709464 A1 | 3/1987 |
| FR | 2704080 A1 | 10/1994 |
| JP | 57017785 | 8/1983 |
| JP | 61092574 | 10/1987 |
| JP | 05171414 | 1/1995 |
| WO | WO 98/05025 | 6/1997 |

*Primary Examiner*—Dennis-Doon Chow
(74) *Attorney, Agent, or Firm*—Kenneth H. Johnson

(57) ABSTRACT

A computer system comprises a keyboard (11), a display screen (13), a first pair of position-sensing electrodes (18.1, 18.2), a second pair of position-sensing electrodes (20.1, 20.2), a signal injection electrode (22), and an oscillator (27). The oscillator injects a signal via the signal injection electrode and the operator's left hand (L) into the operator's body, and this creates a field around the operator's right hand (R). The position-sensing electrodes are arranged underneath the keyboard and sense the strength of the field. This enables the position of the operator's right hand (R) in an X-Y plane above the keyboard to be determined. To this end the position-sensitive electrodes are connected via synchronous detectors (34, 44) and an analogue-to-digital converter (36) to a microprocessor (46), which operates to control the position of a cursor on the display screen.

13 Claims, 2 Drawing Sheets

POSITIONING A CURSOR ON THE DISPLAY SCREEN OF A COMPUTER

Figure 1:
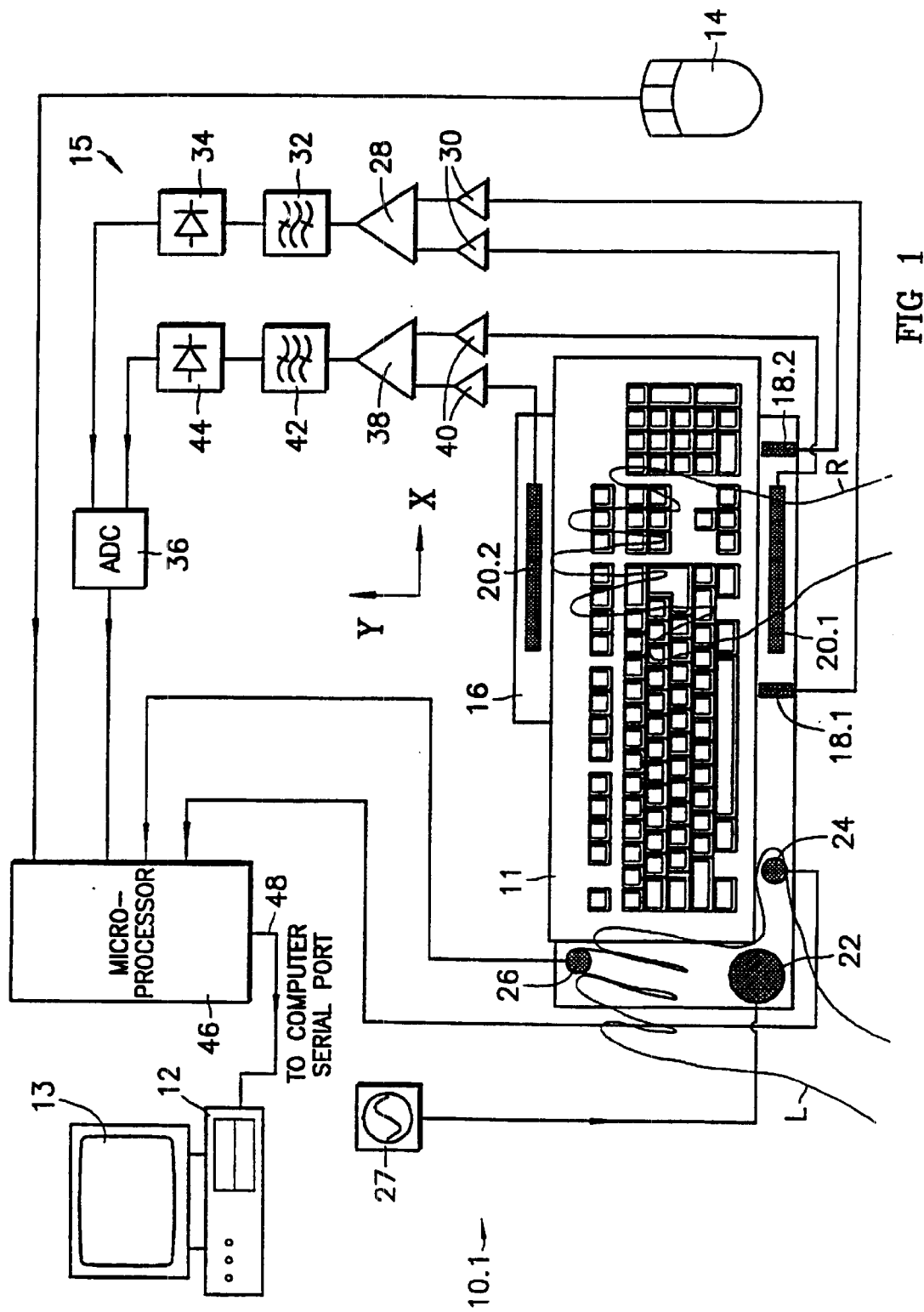

This is a continuation of application Ser. No. 09/684,149, filed Oct. 6, 2000 which was a continuation of PCT/IB99/00579 filed Apr. 6, 1999.

This application is a continuation of PCT/IB99/00579 filed Apr. 6, 1999, which claims priority from South African patent application 98/2910 filed Apr. 6, 1998.

This invention relates to a method of positioning a cursor on the display screen of a computer, under control of an operator, and to means for carrying out the method.

The term "cursor" is to be understood as encompassing a pointer or other device or symbol that is displayed on the display screen of a computer and can be moved about on the screen under control of the operator. A cursor could, for example, be used to point at or designate an icon or attribute displayed on the display screen and that is to be selected.

According to the invention there is provided a method of positioning a cursor on the display screen of a computer, under control of an operator, the method comprising the steps of:

establishing a field about a movable body part of the operator;

sensing the strength of the field at one or more predetermined positions in a fixed reference frame, thereby to provide a control variable corresponding to the position of the body part in the reference frame; and positioning the cursor on the display screen in response to the control variable.

The arrangement may then be such that the movable body part acts as a radiating antenna.

The movable body part may be one of the hands of the operator.

Where the movable body part is one of the hands of the operator, the field may be established by injecting an electrical signal into the operator's body via the other hand of the operator.

The strength of the field may be sensed by means of a first pair of position-sensing electrodes spaced apart in a first direction in the reference frame, to provide a first control variable corresponding to the position of the body part in the first direction, and a second pair of position-sensing electrodes spaced apart in a second direction perpendicular to the first direction, to provide a second control variable corresponding to the position of the body part in the second direction.

The term "electrode" is to be interpreted in a broad sense so as to include also an antenna.

The cursor may be positioned by moving it to a position on the display screen corresponding to the position of the body part in the reference frame, if the body part is within an imaginary boundary in the reference frame, and by continuing to mo % ee it along a line corresponding to the direction in which the body part approached the boundary, if the body part is at or beyond the boundary.

Further according to the invention there is provided a computer system which comprises a display screen, a keyboard for entry of data into the system, and positioning means for controlling the position of a cursor on the display screen, the positioning means comprising:

position-sensing electrodes placed in a fixed reference frame, for sensing the strength of a field established about a movable body part of an operator and thereby to provide a control variable corresponding to the position of the body part in the reference frame; and control means operative in response to the control variable to position the cursor on the display screen in accordance with the position of the body part in the reference frame.

Where said body part is one of the hands of the operator, the position-sensing electrodes may be so arranged with respect to the keyboard that the operator can control the position of the cursor by moving said hand in a hovering manner over the keyboard.

The system may further comprise a signal generator for generating an alternating electrical signal, and an injection electrode for injecting the electrical signal into the body of the operator and so establish the electrical field about said movable body part. Where said movable body part is one of the hands of the operator, the injection electrode may be arranged to inject the electrical signal into the body of the operator via the other hand of the operator.

The system may further comprise one or more click switches for operation by the operator. The click switch or switches may be arranged to be operated by said other hand of the operator.

The system may further comprise a conventional pointing device, and selection means for enabling the operator to select the conventional pointing device for controlling the position of the cursor on the display screen.

The invention extends to an accessory for use in positioning a cursor on the display screen of a computer, under control of an operator, the accessory comprising:

signal generating means for generating an electrical signal;

an injection electrode coupled to the signal generating means, for injecting the electrical signal into the body of the operator, thereby to establish a field about a movable body part of the operator;

position-sensing electrodes for placement in a fixed reference frame, for sensing the strength of the electrical field; and means coupled to the position-sensing electrodes for generating a control variable corresponding to the position of the body part in the reference frame, whereby the cursor can be positioned in response to the control variable.

The invention will now be described in more detail, by way of example, with reference to the accompanying diagrammatic drawings.

Figure 2:
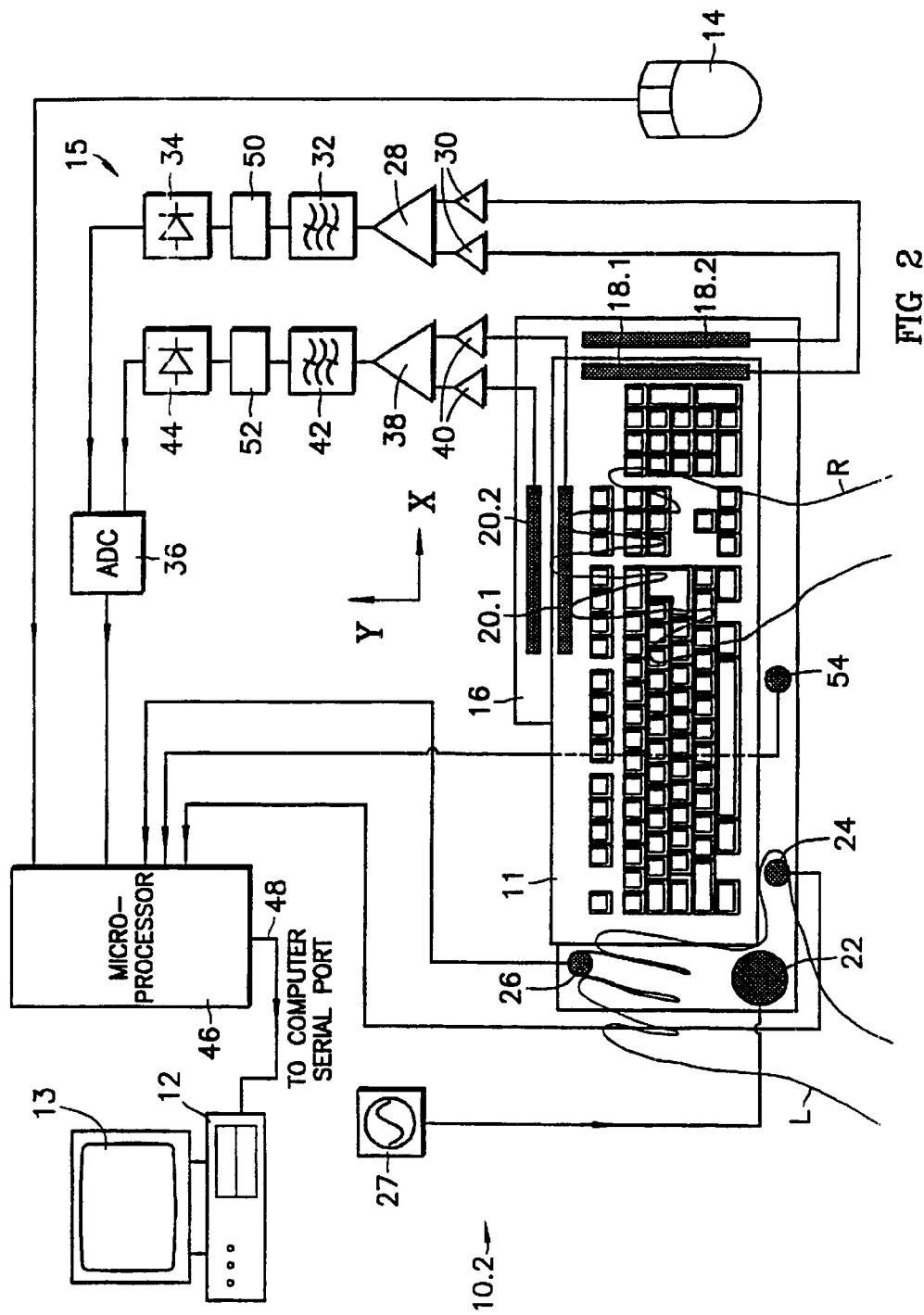

In the drawings:

FIG. 1 illustrates a computer system according to a first embodiment of the invention; and FIG. 2 illustrates a computer system according to a second embodiment of the invention.

Referring first to FIG. 1, reference numeral 10.1 generally designates a computer system comprising a personal computer (PC) of the portable or desk-top type. The PC comprises various components including a keyboard 11, a microprocessor, memory, and disc drives housed in a cabinet 12, a display device or monitor 13, and a pointing device in the form of a mouse 14. These can all be of the conventional type. In accordance with the invention, the computer system is further provided with an accessory 15 for use in controlling the PC, and more particularly the position of a cursor on the monitor 13. The keyboard 11 is connected to the rest of the PC in a conventional manner. The mouse 14 is connected to the rest of the PC via the accessory 15, in a manner that will be described in more detail hereinafter, The accessory 15 may be provided in a form in which it can readily be retrofitted to an existing, conventional PC. Thus, it may comprise a panel 16 which can be placed under the keyboard 11. On the panel 16 there are two pairs of spaced position-sensing electrodes, namely a first pair of electrodes 18.1 and 18.2, and a second pair of electrodes 20.1 and 20.2. The electrodes 18.1 and 18.2 are spaced in an X co-ordinate direction, i.e. along the length of the keyboard, and, as will be explained in more detail hereinafter, are thus able to detect the position of the operator's right hand R in the X co-ordinate direction. The electrodes 20.1 and 20.2 are spaced in the Y co-ordinate direction, i.e. in a direction perpendicular to the X co-ordinate direction, and are thus able to detect the position of the operator's right hand R in the Y co-ordinate direction. Towards the left hand side thereof the panel 16 is provided with a signal injection electrode 22 and a pair of click switches 24 and 26. The click switches 24 and 26, and signal injection electrode 22 are so arranged that, when the operator's left hand L is placed in position on the panel for operating the click switch 24 with the left thumb and the click switch 26 with one of the other left hand fingers, i.e. as illustrated in the drawing, the palm of the operator's left hand will be over the signal injection electrode 22.

It will be understood that the electrode pairs 18.1, 18.2 and 20.1, 20.2, as well as the electrode 22 and the click switches 24 and 26 can be made to form a built-in part of the keyboard 11. In this event the panel 16 can be omitted. It will also be understood 15 that further electrode pairs in addition to the electrode pairs 18.1, 18.2 and 20.1, 20.2 may be provided, so that the position of the right hand R in a third or Z co-ordinate direction, perpendicular to the X-Y plane, can also be determined. It will further be understood that further click switches, in addition to the click switches 24 and 26, may be provided.

The accessory 15 further comprises an oscillator 27 which, in operation, generates an electrical signal having a frequency of about 20 kHz. The output of the oscillator 27 is coupled to the signal injection electrode 22.

The click switches 24, 26 can be of the type that require physical actuation, as in the case of the click switches of a conventional mouse.

The electrodes 18.1 and 18.2 are coupled to the two inputs, respectively, of a difference amplifier 28, each via a high impedance buffer amplifier 30. The output of the difference amplifier 28 is fed via a band-pass filter 32 and a synchronous detector 34 to a first of the inputs of an analogue-to-digital converter (ADC) 36. Likewise, the electrodes 20.1 and 20.2 are connected to the two inputs, respectively, of a difference amplifier 38, each via a high impedance buffer amplifier 40, and the output of the difference amplifier 38 is connected via a band-pass filter 42 and a synchronous detector 44 to a second input of the analogue-to digital converter 36. The band-pass filters 32 and 42 each have a centre frequency which corresponds to the frequency of the oscillator 27.

The accessory 15 further comprises a microprocessor 46. The output of the analogue-to-digital converter 36 is connected to an input of the microprocessor 46. The click switches 24 and 26 are also connected to inputs of the microprocessor 46. Likewise, the mouse 14 is connected to an input of the microprocessor 46.

In one form of the invention the click switches 24, 26 are provided with touch-sensitive electrodes, the arrangement being such that the microprocessor 46 is, via these touch-sensitive electrodes, able to detect whether or not the operator's left hand is in the position illustrated in the drawing, i.e. in a position in which the operator's left thumb and fingers touch the click switches 24, 26. This is the position that is required for the signal from the oscillator 27 to be injected into the body of the operator via the signal injection electrode 22. It will be understood that the injection electrode 22 may be provided on a click or pressure switch, in which event this click or pressure switch will have the same effect as the click switches 24, 26.

The microprocessor 46 has an output 48 which is connected to a serial port of the PC.

Operation of the system will now be described.

When the operator's left hand L is in the position illustrated in the drawing, the electrical signal generated by the oscillator 27 is injected via the signal injection electrode 22 into the operator's body. The injection may be effected by conduction, in which event physical contact with the electrode 22 will be required, or it may be effected by means of capacitive, electromagnetic, or radiation induction, in which event physical contact with the electrode 22 is not required. The injected signal creates an alternating electric field around the operator's body, including, via conduction through the operator's body, the operator's right hand R. The electrodes 18.1, 18.2 and 20.1, 20.2 are able to detect the strength (i.e. amplitude) of this field and, from this determine the position of the operator's right hand in the X and Y co-ordinate directions. This is done in conjunction with the difference amplifiers 28, 38 and the synchronous detectors 34, 44. Any extraneous signals are filtered out by the band-pass filters 32, 42, and the synchronous detectors 34, 44 provide analogue outputs corresponding to the position of the operator's right hand in, respectively, the X and Y co-ordinate directions. The two analogue signals, one provided by the synchronous detector 34 and the other by the synchronous detector 44, are fed to the analogue-to-digital converter 36, which converts the two signals to a digital form. The microprocessor 46 serves to convert the signal into a suitable data bit-stream. The protocol of the bit-stream may be such as to emulate a standard mouse protocol required by a conventional software mouse driver resident in the PC. The bit-stream is fed to a serial port of the PC via the output 48 and is interpreted by the computer as if it was reading data sent by a conventional mouse during normal mouse operation.

The information contained in the bit-stream could also be transmitted to the PC via an existing data link between the 30 keyboard and the PC, using suitable software.

The operator may operate the click switches 24, 26 in the same manner as that in which the click switches of a conventional mouse are operated.

While the operator's left hand L is in the position illustrated in the drawing, as detected by the touch sensitive electrodes on the switches 24, 26 referred to above, the microprocessor 46 operates to disable the conventional mouse 14.

Should the operator want to use the conventional mouse 14, the operator simply has to move his left hand away from the position illustrated in the drawing. This will be detected by the microprocessor 46 via the touch-sensitive electrodes on the click switches 24, 26, and causes the microprocessor to disable the input received from the analogue-to-digital converter 36 and, instead, switch over to the input received from the mouse 14.

The system may also operate through other forms of energy induced in the body of the operator, such as, for example, the 50 Hz normally used for mains power and which will normally be induced in the body of the operator via cables and other electrical equipment in the vicinity of the operator, or by any other non-contact injector.

Referring now to FIG. 2, reference numeral 10.2 generally indicates a computer system which is similar to the computer system 10.1, the same reference numerals being used to indicate the same or similar parts. The system 10.2 differs from the system 10.1 as follows hereunder.

First, the electrodes 18.1 and 18.2 are arranged so that they are both on one side, in the X direction, of the operator's right hand R, and the electrodes 20.1 and 20.2 are arranged so that they are both on one side, in the Y direction, of the operator's right hand R. This arrangement has the advantage that it renders the system less sensitive to electromagnetic noise and less sensitive to changes in the height of the operator's right hand above the keyboard 11, and that it is easier to implement physically than in the case of the electrode arrangement illustrated in FIG. 1.

Secondly, an analogue linearizer 50 is connected between the band-pass filter 32 and the synchronous detector 34. This is required to compensate for the non-linearity introduced by the fact that the electrodes 18.1 and 18.2 are both to one side of the operator's right hand instead of being on opposite sides of the hand as-in the FIG. 1 embodiment. Likewise, a linearizer 52 is connected between the band-pass filter 42 and the synchronous detector 44.

The compensation for non-linearity can also be effected digitally, in which event it can conveniently take place in the microprocessor 46.

Thirdly, the system 10.2 is provided with an auto calibration button 54 which is connected to an input of the microprocessor 46. It will be understood that the switch button 54 could also be in the form of a touch pad. When the switch button 54 is activated by means of the operator's right hand R, the microprocessor will perform a calibration function, correlating the position of the operator's right hand R and the cursor position on the computer screen 13. This is possible because the operator's right hand, when activating the switch button 54, will of necessity be in a known position in the X-Y plane.

What is claimed is:

1. A method of positioning a cursor on a display screen, under control of an operator, the method comprising the steps of:

establishing a field about a movable body part of the operator;

sensing the strength of the field at predetermined positions in a fixed reference frame defining an imaginary boundary having a rectangular profile when viewed in plan view, thereby to provide a control variable corresponding to the position of the body part in an active region defined by the reference frame; and positioning the cursor on the display screen in response to the control variable; the strength of the field being sensed in a contact-less manner by arranging a first pair of position-sensing electrodes that are positioned adjacent one another, along one side on the periphery of the fixed reference frame, and a second pair of position-sensing electrodes that are positioned adjacent one another along a second side on the periphery of the fixed reference frame, that is perpendicular to said one side thereof, the electrodes of the first pair of electrodes being spaced apart in a first direction perpendicular to said one side of the fixed reference frame and providing a first control variable indicative of the distance, in said first direction, of said body part from said one side of the reference frame, the electrodes of the second pair of electrodes extending perpendicularly with respect to the first pair of electrodes and being spaced apart in a second direction perpendicular to said second side of the fixed reference frame and providing a second control variable indicative of the distance, in said second direction of said body part from said second side, the cursor being positioned in response to said control variables by movement of said body part in said active region.

2. The method as claimed in claim 1, wherein the movable body part is one of the hands of the operator.

3. The method as claimed in claim 2, wherein the field is established by injecting an electrical signal into the operator's body via the other hand of the operator.

4. The method as claimed in claim 1 wherein the cursor is positioned by moving it to a position on the display screen corresponding to the position of the body part (R) in the reference frame, if the body part is within an imaginary boundary in the reference frame, and by continuing to move it along a line corresponding to the direction in which the body part approached the boundary, fi the body part is at or beyond the boundary.

5. The method as claimed in claim 1, wherein the strength of the field is further sensed by a third pair of position-sensing electrodes at a third side, perpendicular to said first and second sides, on the periphery of the active region, thereby to provide a third control variable indicative of the distance, in a third direction perpendicular to said first and second directions, of said body part from said third side, the cursor being positioned in response to said first, second, and third control variables by movement of said body part in said active region.

6. A system which comprises a display screen, and positioning means for controlling the position of a cursor on the display screen, the positioning means comprising:

a first pair of position-sensing electrodes that are positioned adjacent one another along one side of the periphery of a fixed reference frame defining an imaginary boundary having a rectangular profile when viewed in plan view, for sensing the strength of a field established about a movable body part of an operator and thereby to provide a first control variable corresponding to the position of the body part in the reference frame; a second pair of position-sensing electrodes that are positioned adjacent one another along a second side on the periphery of the fixed reference frame, that is perpendicular to said one side thereof; and control means operative in response to the control variables to position the cursor on the display screen in accordance with the position of the body part in an active region defined by the reference frame;

the electrodes of said first pair of position-sensing electrodes being spaced apart in a first direction perpendicular to said one side of the fixed reference frame and providing, in use, a first control variable indicative of the distance, in said first direction, of said body part from said one side of the reference frame, the electrodes of the second pair of electrodes extending perpendicularly with respect to the first pair of electrodes and being spaced apart in a second direction perpendicular to said second side of the fixed reference frame and providing a second control variable indicative of the distance in said second direction of said body part from said second side, the cursor being positioned in response to said control variable by movement of the body part in said active region.

7. The system as claimed in claim 6, which further comprises a signal generator for generating an alternating electrical signal, and an injection electrode for injecting the electrical signal into the body of the operator and so establish the electrical field about said movable body part.

8. The system as claimed in claim 7, which includes a keyboard for entry of data into the system and wherein said body part is one of the hands of the operator, and wherein the position-sensing electrodes are so arranged with respect to the keyboard that the operator can control the position of the cursor by moving said one hand in a hovering manner over the keyboard.

9. The system as claimed in claim 8, wherein the injection electrode is arranged to inject the electrical signal into the body of the operator via the other hand of the operator.

10. The system as claimed 8 which further comprises one or more click switches for operation by the operator.

11. The system as claimed in claim 8, wherein the click switch or switches are arranged to be operated by said other hand of the operator.

12. The system as claimed in claim 6 which further comprises a conventional pointing device and selection means for enabling the operator to select the conventional pointing device for controlling the position of the cursor on the display screen.

13. An accessory for use in positioning a cursor on a display screen, under control of an operator, which comprises:

signal generating means for generating an electrical signal;

an injection electrode coupled to the signal generating means, for injecting the electrical signal into the body of the operator, thereby to establish an electrical field about a movable body part of the operator;

a first pair of position-sensing electrodes that are positioned adjacent one another along one side of the periphery of a fixed reference frame defining an imaginary boundary having a rectangular profile when viewed in plan view, for sensing the strength of a field established about a movable body part of an operator and thereby to provide a first control variable corresponding to the position of the body part in the reference frame;

a second pair of position-sensing electrodes that are positioned adjacent one another along a second side on the periphery of the fixed reference frame, that is perpendicular to said one side thereof; and means coupled to the position-sensing electrodes for generating control variables corresponding to the position of the body part in the reference frame, whereby the cursor can be positioned in response to the control variables;

the electrodes of said first pair of position-sensing electrodes being spaced apart in a first direction perpendicular to said one side of the fixed reference frame and providing, in use, a first control variable indicative of the distance, in said first direction, of said body part from said one side of the reference frame, the electrodes of the second pair of electrodes extending perpendicularly with respect to the first pair of electrodes and being spaced apart in a second direction perpendicular to said second side of the fixed reference frame and providing a second control variable indicative of the distance in said second direction of said body part from said second side, the cursor being positioned in response to said control variable by movement of the body part in said active region.

* * * * *